United States Patent [19]

Tesolin

[11] 4,179,095
[45] Dec. 18, 1979

[54] PNEUMATICALLY OPERATED AIR LOCK FOR AIR DUCTS, PARTICULARLY FOR AIR CONDITIONING PLANTS

[76] Inventor: Luciano Tesolin, Via Conserva, Villanova (Pescara), Italy

[21] Appl. No.: 885,047

[22] Filed: Mar. 9, 1978

[30] Foreign Application Priority Data

Mar. 10, 1977 [IT] Italy ................. 48422 A/77

[51] Int. Cl.² ........................................... F16K 31/385
[52] U.S. Cl. ...................................... 251/30; 251/38; 251/61.1
[58] Field of Search ................... 251/61.1, 38, 30

[56] References Cited

U.S. PATENT DOCUMENTS 3,685,788  8/1972  Bloomfield ............. 251/61.1 X 3,732,888  5/1973  Convain et al. ............. 251/61.1 X

*Primary Examiner*—Arnold Rosenthal
*Attorney, Agent, or Firm*—Beveridge, De Grandi, Kline & Lunsford

[57] ABSTRACT

A pneumatically operated air lock, comprising in combination a casing one end of which is connected to an air conveying plant, while the other end is provided with an outlet grid, a choke duct arranged in the casing and having an outlet area coincident with the delivery area of the casing, and a membrane positioned within the choke duct, capable of taking an open position wherein the membrane is substantially adherent to one wall of the choke duct, allowing the passage of the air, and a second position wherein said membrane extends across the choke preventing the outflow of the air.

3 Claims, 4 Drawing Figures

U.S. Patent  Dec. 18, 1979  4,179,095
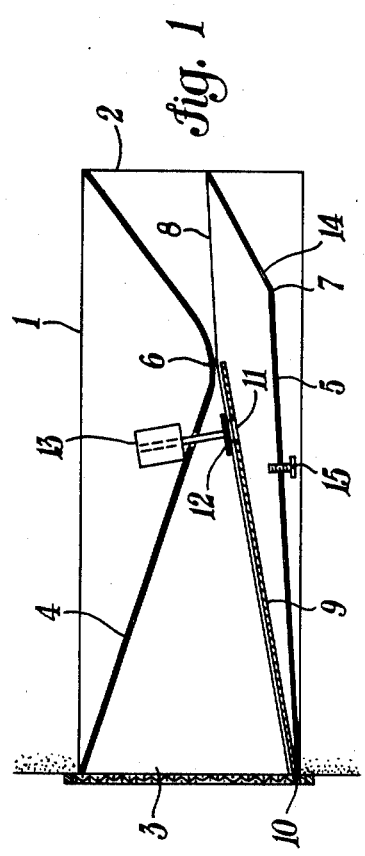
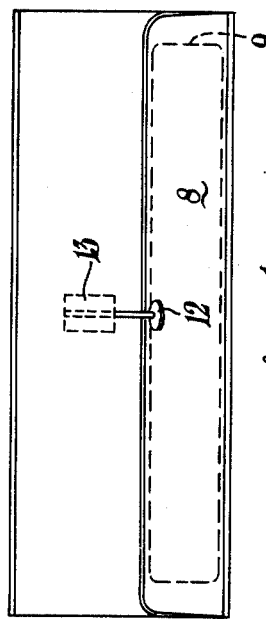
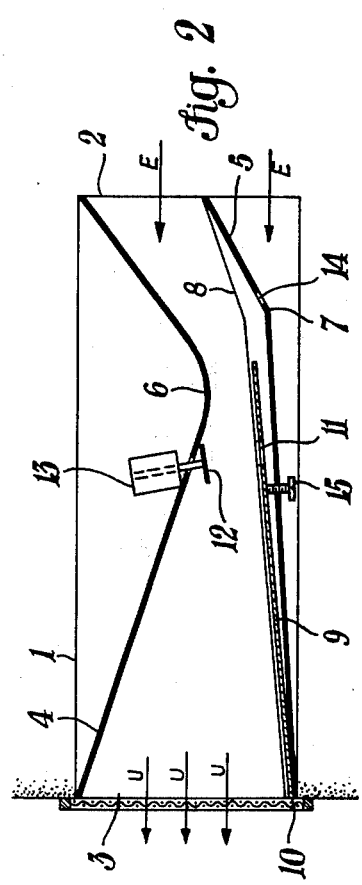
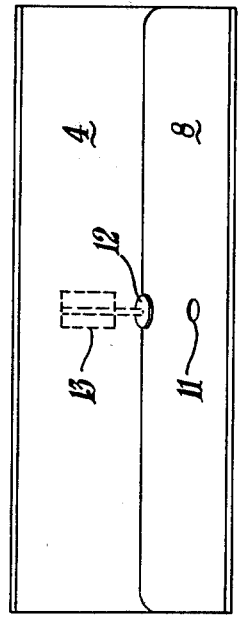

PNEUMATICALLY OPERATED AIR LOCK FOR AIR DUCTS, PARTICULARLY FOR AIR CONDITIONING PLANTS

The present invention relates to a pneumatically operated air lock for air ducts, particularly suitable for air conditioning plants.

As is known to persons skilled in the art, there are on the market various types of air delivery outlets, provided with means for opening or closing the outlet, operated by a thermostat or other control element. Such outlets, generally are of shutter-, or gate-, or louver-types, and so on, operated by an electric motor. Such outlets are noisy both mechanically and aerodynamically, are complex, and thus are expensive and subject to damage resulting in maintenance costs.

Also air delivery outlets have been provided which are operated by a membrane or by a bellows, instead of an electric motor, such outlets being powered by the air conveyed by the plant, but such members operate on a mechanical system with the above cited drawbacks.

The purpose of this invention is that of providing a device of the concerned type, having an extremely simple structure, a safe and noiseless operation, and a low cost, and being substantially free from maintenance.

According to this invention, an air lock for air ducts is provided comprising a casing one end of which is connected to the air conveying plant, while the other end is provided with a delivery grid, a choke duct located in the casing, and having its delivery area coincident with the delivery area of the casing, and a membrane located inside the choke duct, capable of taking an open position, in which the membrane is positioned adherent to the base wall of the choke duct, allowing thus the passage of the air, and a second position wherein the membrane adheres to the apex of the choke, blocking the outflow of the air.

The membrane consists of a layer of flexible material, the two cross sides of which are fastened to the corresponding sides of the base wall of the choke duct, and the body of which is provided with a hole. A disk is responsive to an electromagnet to close said hole in order to cause the inflation of the membrane and the consequent locking of the air flow.

This invention will be now described with reference to the attached drawings showing by way of non limitative example one preferred embodiment of the invention itself.

In the drawings:

FIG. 1 is a longitudinal sectional view of the device in its closed position;

FIG. 1A is an elevational front view, with the grid removed;

FIGS. 2 and 2A are two view similar to FIGS. 1 and 1A showing the open position.

With reference to FIGS. 1 and 1A, casing 1 is provided with an inlet 2 communicating with an air duct, and an outlet 3 provided with a grid or other apertured element for delivering the air to the concerned room or zone.

Inside the casing 1, a duct is defined by two rigid walls 4 and 5 so shaped as to provide a choke having two deflection points 6 and 7.

In a position adjacent the base wall 5 of the choke duct, is mounted a flexible membrane 8, the ends of which are fastened to the corresponding cross edges of the wall 5, and steadily connected to the rigid plate 9 hinged at 10. Both the membrane 8 and the plate 9 are apertured at point 11 aligned with a disk valve 12, operated by an electromagnet 13 mounted on the upper wall 4. The lower wall 5 of the choke duct is apertured at 14.

The operation is as follows: the air coming from the plant passes through the inlet 2 of the casing 1, according to the arrows E (FIG. 2) and enters simultaneously into the choke duct and under the base wall 5. The air passing under the wall 5 passes through the holes 14 and 11 and outflows together with the balance of the air, along the direction of the arrows U.

Upon receipt of a signal coming from a thermostat or other sensitive element, the electromagnet 13 is de-energized and the disk 12 shuts off the hole 11. Under these conditions the air entering through hole 14 the membrane 8 until the membrane itself and the plate 9 steadily connected thereto contact the apex 6 of the shaped upper wall, blocking entirely the air flow as shown in FIG. 1.

As soon as the electromagnet 13 is energized, the disk 12 moves away from the hole 11 and the membrane 8 deflates, coming back to the position of FIG. 2.

It is evident that the breather hole 11 could be made through the body of the air lock instead of the membrane, without changing either the planning or the operation of the device. The screws 15 serve the function of adjusting the air flow rate.

From the preceding disclosure it appears clear that it is the air itself which operates the opening and the closure of the delivery outlet, in a direct way, with no use of mechanical associated means. Consequently, the operation is safe. The sole mechanical member is the magnet 13 which can be replaced, if the case may be, by an analogous technologically equivalent member.

If the air lock is to be used at an internal point of a duct, clearly the grid 3 will be dispensed with.

The present invention has been described in one preferred embodiment, being however understood that constructive changes might be practically entered without departing from the scope of the present industrial privilege.

Having thus described the present invention, what is claimed is:

1. A pneumatically operated air lock comprising a casing having an inlet end, adapted to be connected to an air conveying duct, and an outlet end; a choke duct within said casing and having an outlet area coincident with said casing outlet end; a membrane positioned within said choke duct and consisting of a layer of flexible material having first and second cross sides fastened respectively to corresponding sides of one wall of said choke duct, said layer of flexible material having a breather hole therethrough; an electromagnet; a disk responsive to said electromagnet and capable of assuming a first position in which the breather hole is open permitting said membrane to be substantially adherent to said one wall of said choke duct, allowing the passage of air from said inlet end to said outlet end, and a second position in which the breather hole is blocked by said disk, causing inflation of said membrane and extension of said membrane across said choke duct to prevent airflow from said inlet end to said outlet end.

2. An air lock as claimed in claim 1 further comprising a rigid plate having a first end hingedly connected to said casing outlet and underlying said membrane.

3. An air lock as claimed in claim 1 in which said one wall of said choke duct is provided with a hole to allow the passage of air for inflating said membrane when the breather hole is blocked by said disk.

* * * * *